United States Patent [19]

Salkeld

[11] 3,955,784
[45] May 11, 1976

[54] MIXED MODE PROPULSION AEROSPACE VEHICLES

[76] Inventor: Robert J. Salkeld, Malibu, Calif. 90017

[22] Filed: Mar. 18, 1974

[21] Appl. No.: 451,810

Related U.S. Application Data

[63] Continuation of Ser. No. 227,827, Feb. 22, 1972, abandoned, which is a continuation-in-part of Ser. No. 38,793, May 19, 1970, abandoned, which is a continuation-in-part of Ser. No. 847,094, Aug. 4, 1969, abandoned.

[52] U.S. Cl. ............................... 244/172; 60/245; 244/62
[51] Int. Cl.² ........................................ B64G 1/20
[58] Field of Search ............. 244/2, 62, 63, 74, 172, 244/158, 160; 60/203, 204, 225, 245

[56] References Cited
UNITED STATES PATENTS

| | | | |
|---|---|---|---|
| 3,215,372 | 11/1965 | Price | 244/74 |
| 3,215,373 | 11/1965 | Price | 244/74 |
| 3,232,560 | 2/1966 | Moise et al. | 244/1 SS |
| 3,261,571 | 7/1966 | Pinnes | 244/1 SS |
| 3,373,564 | 3/1968 | Maybin | 60/245 X |
| 3,514,953 | 6/1970 | Kephart | 60/258 |
| 3,541,793 | 11/1970 | Schmidt | 60/225 X |
| 3,570,249 | 3/1971 | Baum et al. | 60/259 |

FOREIGN PATENTS OR APPLICATIONS

| | | | |
|---|---|---|---|
| 704,956 | 3/1965 | Canada | 60/204 |
| 1,044,780 | 10/1966 | United Kingdom | 244/1 SS |

OTHER PUBLICATIONS

Barrere, M. et al., *Rocket Propulsion*, Elsevier Publishing Co., New York, 1960, pp. 605–612.

Cushman, Robert H., "F-103 Demise Clouds Dual Cycle Future," Aviation Week, 9/9/57, p. 101.

Hill, Philip G. et al., Mechanics and Thermodynamics of Propulsion, Addison–Wesley Publishing Co., Reading, Massachusetts, 1965, pp. 322–335.

*Primary Examiner*—Trygve M. Blix
*Assistant Examiner*—Barry L. Kelmachter
*Attorney, Agent, or Firm*—Lyon & Lyon

[57] ABSTRACT

An aerospace vehicle incorporates within the same stage two different main propulsion systems that are operated in sequence. The first system involves the use of high density-impulse propellants, and the second system involves the use of lower density-impulse propellants to achieve higher final velocities than would otherwise be the case if the total available volume were used for either set of propellants separately. In one arrangement, one stage of a propulsion aerospace vehicle incorporates provisions for carrying and burning three different propellants, —two fuels and a common oxidizer or two oxidizers and a common fuel. Certain of the wing and/or body structures are designed to serve as tankage volume for low pressure storage of at least one of the propellants, which is one that does not require special pressurized tanks. The use of common oxidizer or fuel, and common wing-/body/tankage structure, simplifies and lightens the vehicle, thus enhancing its ability to realize the benefits of what is referred to as the mixed-mode propulsion principle. When one of the fuels is utilized in air-breathing engines, additional flexibility is provided for vehicle operation in the atmosphere as well as in space.

12 Claims, 16 Drawing Figures

INVENTOR
ROBERT J. SALKELD
BY
Lyon & Lyon
ATTORNEYS

MIXED MODE PROPULSION AEROSPACE VEHICLES

The present application is a continuation of my pending application Ser. No. 227,827 now abandoned filed Feb. 22, 1972 which is a continuation-in-part of my U.S. application Ser. No. 38,793 filed May 19, 1970, now abandoned which is a continuation-in-part of my application Ser. No. 847,094, filed Aug. 4, 1969, now abandoned.

The present invention relates to aerospace vehicles and in particular to improved means and techniques for obtaining improved results from the use of propulsion systems.

An object of the present invention is to provide means and techniques particularly useful in accomplishing orbital flight with a single stage vehicle and within present-day practical limits.

Another object of the present invention is to provide improved aerospace vehicles and in particular improved propellant combinations and configurations for obtaining improved performance and flexibility in accordance with what I refer to as the mixed-mode propulsion principle.

Another object of the present invention is to provide a propulsion system in which different propulsion modes are combined to advantage in reducing initial weight and/or manufactured hardware weight of an aerospace vehicle, particularly one intended to be placed in orbit.

Another object of the present invention is to provide means and techniques involving the sequential use of different propulsion modes for achieving results not capable of being achieved when the available propellant space is used for propellant in a single propulsion mode operation.

An object of the present invention is to provide means and techniques particularly useful in accomplishing orbital flight within a one stage vehicle and within present-day practical limits.

Another object of the present invention is to provide a vehicle configuration in which different propulsion modes can be combined to advantage to reducing initial weight and/or manufactured hardware weight of a vehicle intended to be placed in orbit.

Another object of the present invention is to provide means and techniques involving the sequential or overlapping use of different propulsion modes for achieving performance and flexibility results not capable of being achieved when the available propellant volume is used for propellant in a single propulsion mode operation.

The features of the present invention which are believed to be novel are set forth with particularily in the appended claims. This invention itself, both as to its organization and manner of operation, together with further objects and advantages thereof, may be best understood by reference to the following description taken in connection with the accompanying drawings in which:

FIG. 6 illustrates a side view of a modified vehicle.

FIG. 7 is a top plan view with location of various compartments and engines being also illustrated.

FIG. 8 is a view taken as indicated by the arrows 8—8 in FIG. 7.

FIG. 9 illustrates rather generally weight and volume relations in the vehicle of FIGS. 6–8.

FIG. 10 is a graphical representation illustrating other features of the invention.

Figure 11:
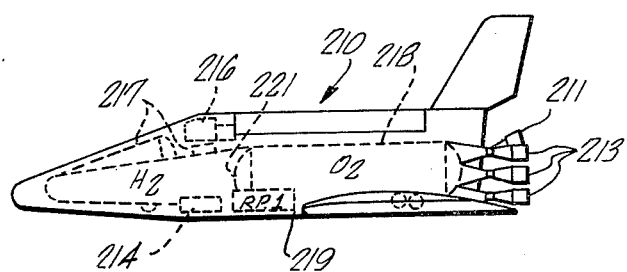
FIG. 11 illustrates a side view of another vehicle configuration incorporating features of the present invention with the airbreathing engines retracted.
Figure 12:
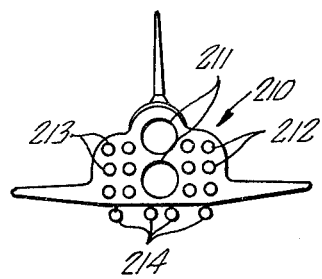
FIG. 12 is a view of the aft end of the vehicle shown in FIG. 11 showing arrangements of the rocket and airbreathing engines in extended position.
Figure 13:
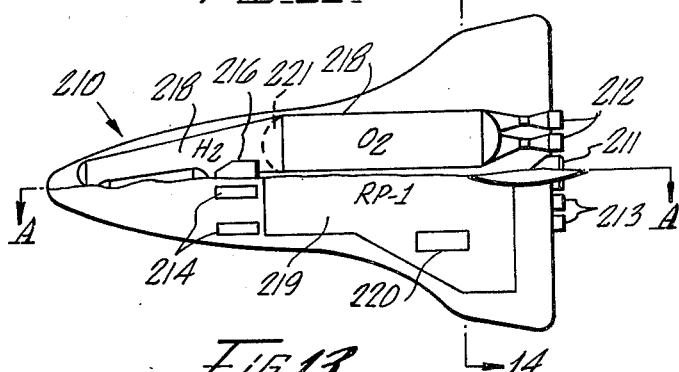

FIG. 13 is an irregular plan view of the vehicle shown in FIG. 11 with the outer skin of the vehicle removed for purposes of illustrating the location of various tanks, compartments, landing gear well and engines, the upper portion of FIG. 13 above line A—A being in general a view taken from the topside of the vehicle and the lower portion of FIG. 13 is a view taken from the underside of the vehicle.

Figure 14:
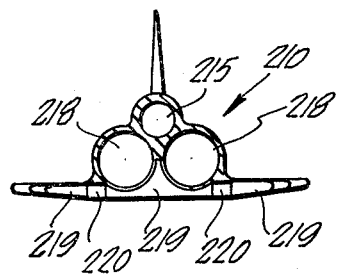

FIG. 14 is a cross-sectional view taken as indicated by arrows 14—14 in FIG. 13.

Figure 15:
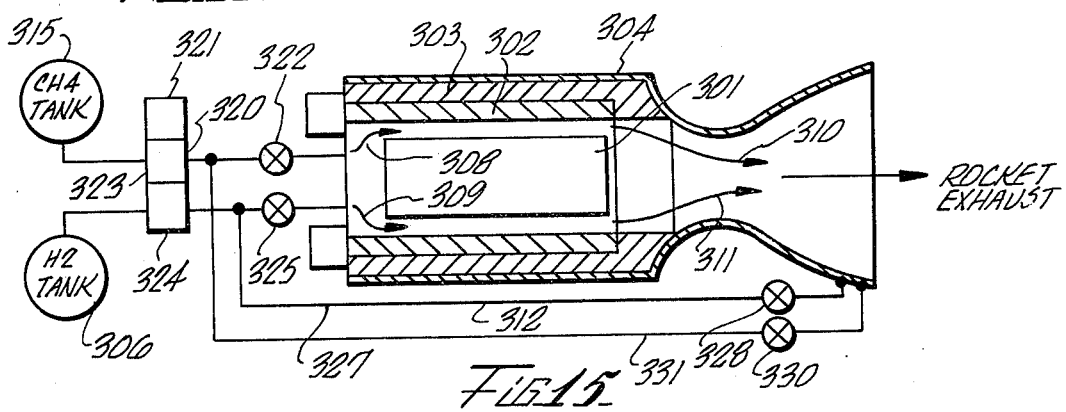

FIG. 15 is a sectional view of a mixed mode nuclear rocket engine.

Figure 16:
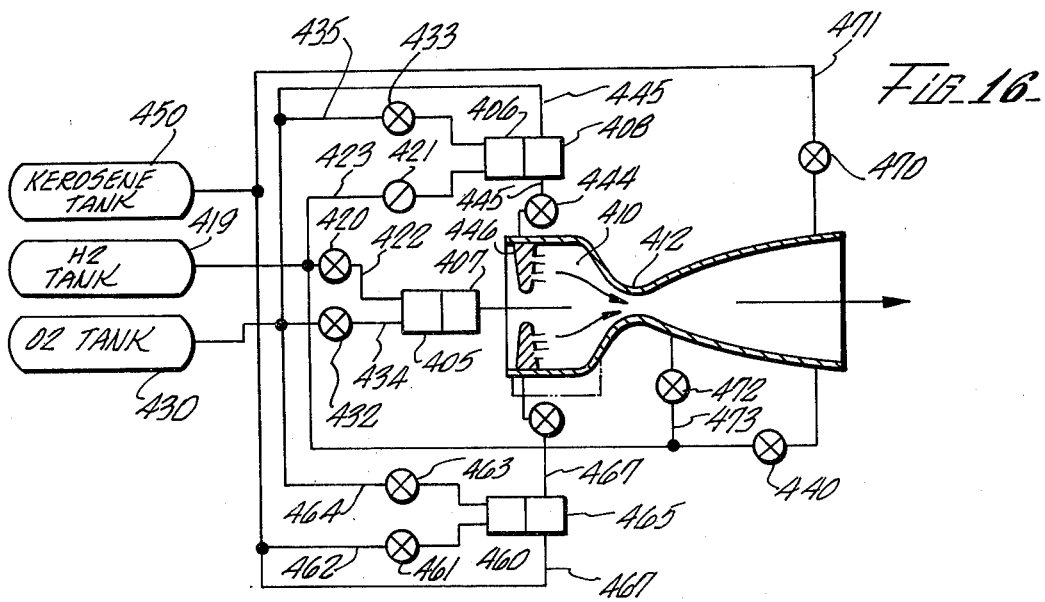

FIG. 16 is a sectional view of a mixed mode chemical rocket engine.

The following description includes the term "stage" and that term may refer either to a propulsion stage or a vehicle stage. Technically, the first is more general, preferred and usually understood to prevail in discussions of vehicle physics. Thus, in this disclosure the first definition is intended unless otherwise indicated, and for these purposes the terms "propulsion stage" and "vehicle stage" may be defined as follows.

A propulsion stage is a period of time during main propulsion operation, during which operation of all operating main propulsion mode (s) (i.e. specific propellants or propellant combinations) is continuous, and during which no vehicle stage or half-stage is separated or jettisoned. Any initiation or termination of a main propulsion mode, or separation of any vehicle stage or half-stage, signals the beginning or end of a propulsion stage.

A vehicle stage is a portion or portions (in aggregate) of a vehicle, including but not limited to, propellant tankage and engine(s), which contributes main propulsion in a propulsion stage. (A "half-stage" is usually understood to be a portion or portions of a vehicle, inclduing but not limited to propellant tankage or engine (s) but not both — which contributes main propulsion and is jettisoned from the rest of the vehicle at some particular time during flight.)

Thus, while a propulsion stage cannot survive termination of a vehicle stage, a vehicle stage can exist as part of the flight vehicle, through two or more propulsion stages.

Figure 1:
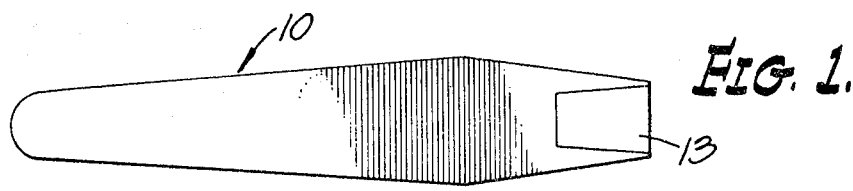
FIG. 1 illustrates a side view of a typical vehicle incorporating features of the present invention.
Figure 2:
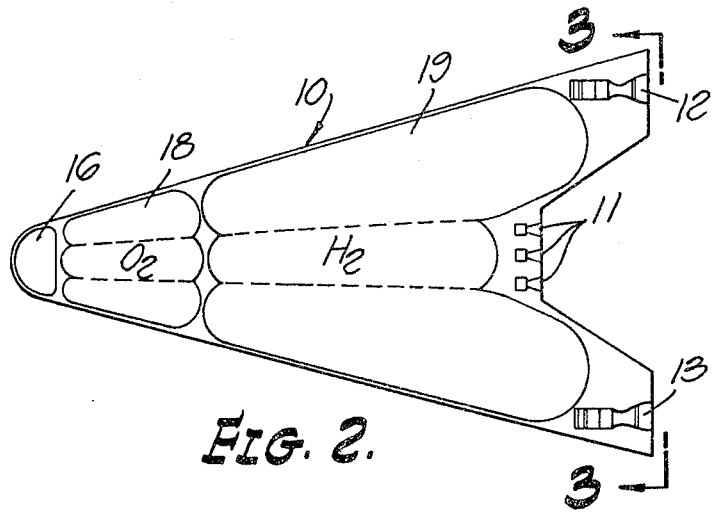
FIG. 2 is a top plan view with the location of various compartments and engines being also illustrated.
Figure 3:
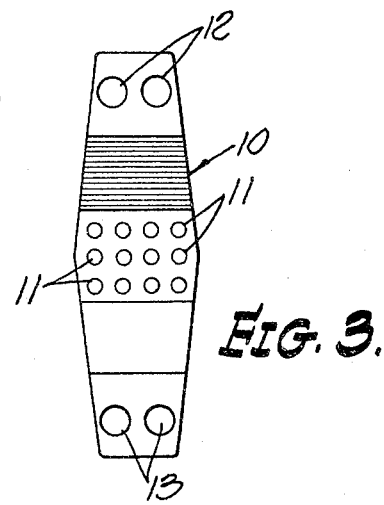
FIG. 3 is a view taken as indicated by the arrows 3—3 in FIG. 2.

The generalized form of space vehicle 10 shown in FIGS. 1–3 is features by two different forms of fuel consuming engines; namely, a centrally located group of twelve engines 11 each of which may, for example, be of the Pratt and Whitney designation LR 129, $H_2$-$O_2$ engines capable of developing an individual thrust of 250,000 pounds with a specific impulse, $I_1$ equal to 430 seconds; and two groups of, for example, nuclear engines 12, 13 each group consisting of a pair of Nerva nuclear engines, each engine being capable of developing an individual thrust of 75,000 pounds, with specific impulse, $I_1$ equal to 825 seconds.

As illustrated, these engines 11 and 12, 13 are located aft, the payload compartment 16 is in the forward nose portion and the remaining portion of the vehicle includes two fuel compartments; namely, a liquid oxygen compartment 18 and a liquid hydrogen compartment 19.

These engines incorporate as component parts thereof conventional valving means (not shown) controllable from the payload compartment 16 through which propellant from compartments 18 and 19 to such engines is supplied.

These engines in accordance with important features of the present invention are operated sequentially, i.e., after operation of the group of engines 11 during and after lift-off the nuclear engines 12, 13 are operated. Thus, initially during operation of engines 11, liquid hydrogen and liquid oxygen from compartments 18 and 19 is supplied and during subsequent operation of engines 12, 13, only liquid hydrogen from compartment 19 is being supplied.

In accordance with one of the important features of the present invention, the volume and hence weight distribution alloted to each propellant compartment is optimized to achieve maximum gain in velocity of the vehicle which, as is described in more detail in connection with FIG. 4, amounts to a velocity greater than that achieved when the total available propellant compartment space, V, (FIG. 4) is used exclusively for chemical type engines 11 or exclusively for nuclear type engines 12, 13.

Figure 4:
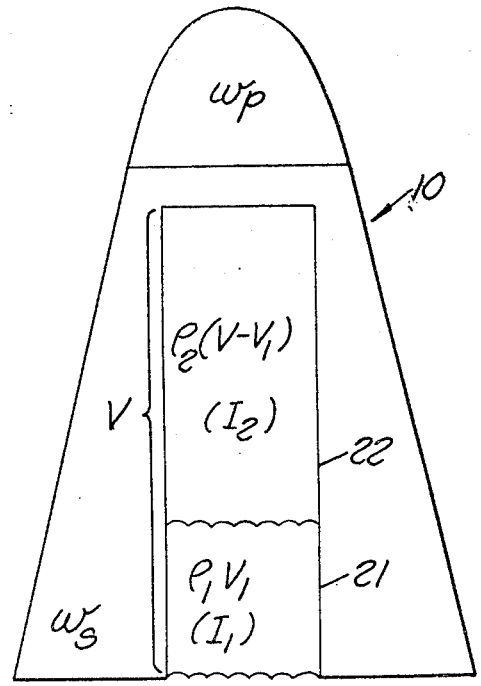
FIG. 4 illustrates rather generally weight and volume relations in the vehicle of FIGS. 1–3.

With reference to FIG. 4, the total volume available for propellant is designated as V, and the volume 21 used for the chemical engines is designated as $V_1$, hence the volume 22 used for the nuclear engine is equal to the total volume V minus $V_1$ or $V-V_1$ as also designated in FIG. 4.

FIG. 4 is illustrative also of weight relations and includes the designations $W_t$ and $W_p$ and also $\rho_1$ and $\rho_2$ and $I_1$ and $I_2$ where:

$W_t$ is equal to weight of vehicle 10 less payload and less propellant.

$W_p$ is the payload weight.

$\rho_1$ is the bulk density of propellant in volume $V_1$, in this example the average density of liquid oxygen and hydrogen.

$\rho_2$ is the bulk density of propellant in volume $V-V_1$, in this example the density of liquid hydrogen.

$I_1$ is the specific impulse of Mode 1 fuel, in this example the mixture of hydrogen and oxygen.

$I_2$ is the specific impulse of Mode 2 fuel, in this example hydrogen.

The mass ratios $r_1$ and $r_2$ are as set forth in the following two equations:

$$r_1 = \frac{\rho_1 V_1 + \rho_2(V-V_1) + (W_t + W_p)/g}{\rho_2(V-V_1) + (W_t + W_p)/g} \quad (1)$$

$$r_2 = \frac{\rho_2(V-V_1) + (W_t + W_p)/g}{(W_t + W_p)/g} \quad (2)$$

It will be seen that the numerator in equation (1) is the initial weight of the vehicle completely loaded with propellant in volumes 21 and 22 and that the denominator is the weight of the vehicle after the propellant of the initial Mode 1 propulsion system has been used. Likewise, the numerator in equation (2) is the same as the denominator of equation (1) and that the denominator of equation (2) represents the weight of the vehicle after all propellant in Volumes 21 and 22 has been used.

Applying the well-known rocket equation, the change in velocity $\Delta v$ which results in the sequential operation of the two propulsion modes, in this example the chemical mode followed by the nuclear mode, is set forth in equation (3) below:

$$\Delta v = gI_1 \log_e r_1 + gI_2 \log_e r_2 \quad 3$$

where $g$ represents the acceleration of gravity.

The values of $r_1$ and $r_2$ in equations (1), (2), and (3) are the same. Thus it will be appreciated that the gain in velocity $\Delta v$ may be repesented in terms of the volume $V_1$.

Principles of calculus are used to learn of conditions for an optimum, i.e. maximum. For this purpose the expression $\Delta v$ is differentiated with respect to volume $V_1$ and the resulting mathematical expression is set equal to zero as represented in equation (4).

$$\frac{d(\Delta v)}{dV_1} = 0 \quad (4)$$

When this is accomplished, it will be seen that a desired maximum value of $\Delta v$ occurs when $$V_1 = \frac{\rho_1 I_1}{\rho_2 I_2} - 1 \cdot \frac{\rho_2 V + W_t + W_p}{\rho_1 - \rho_2} \quad (5)$$

In this equation the quantities $\rho$, $I_1$ and $I_2$ are the result of a multiplication with the product in each case being referred to as the density-impulse. This equation substantiates applicant's novel teaching that the density-impulse of the first propulsion stage should be greater than the density-impulse of the second propulsion stage and that the density of the propellant in the first propulsion stage should be greater than the density of the propellant in the second stage.

Figure 5:
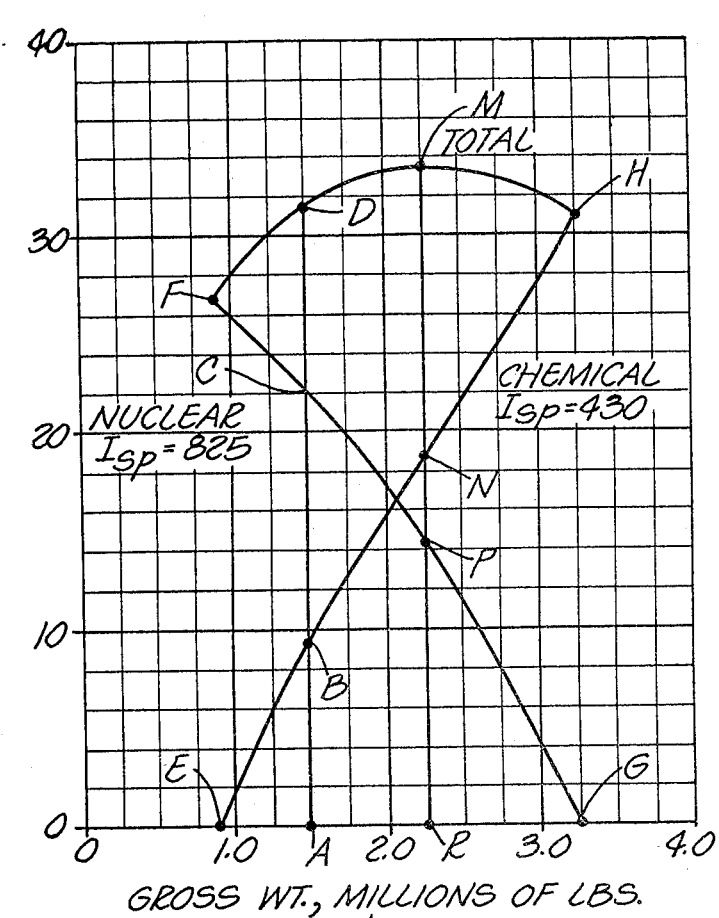
FIG. 5 is a graphical representation illustrating features of the present invention.

This novel teaching is incorporated in the present illustrated apparatus to achieve single stage orbital flight as represented also in FIG. 5 where the ordinates of the graphical representations are in terms of velocity gain $\Delta v$, expressed in thousands of feet per second, and the abscissas are gross weight expressed in millions of pounds in accordance with the following mathematical expression which also appears in equation (1) above $$\text{Gross Weight} = \rho_1 V_1 + \rho_2 (V-V_1) + W_t + W_p \quad 6$$

The performance curves in FIG. 5 refer to a vehicle having a given usable propellant volume as defined above in relation to FIG. 4, and in which the portion of volume V (i.e. volume $V_1$) allocated to Mode 1 is varied. This parameter $V_1$ varies from 0 to maximum volume V resulting in a corresponding variation in gross weight. In this respect, it is noted that the abscissa of points E and F corresponding to $V_1$ equal zero and the abscissa of points G and H correspond to $V_1$ equal the maximum volume, V. Further, it is noted that FIG. 5 represents the performance of various versions of a vehicle having a weight range extending from approximately 0.9 million pounds (corresponding to points E and f) to approximately 3.25 million pounds (corresponding to points G and H).

In analyzing FIG. 5, it is noted that to achieve orbital flight a $\Delta v$ of 26,000 feet per second in addition to those drag and gravity losses equivalent to perhaps about 6,000 feet per second is required. In other words, orbital flight is expected only when the ideal or calculated $\Delta v$ appreciably exceeds 32,000 feet per second. This is achieved in accordance with features of the present invention using only a single stage vehicle.

In FIG. 5, the nonlinear line EBH represents the characteristic line of chemical Mode 1 using hydrogen and oxygen as the propellant and the nonlinear line GCF represents the line of nuclear Mode 2 using only hydrogen as the propellant. The total velocity change represented at, for example, the point D on that arcuate curve extending between points FDMH is the result of propulsion in Mode 1 followed by Mode 2. Thus, the vertical distance AB represents the velocity as a result of completion of chemical Mode 1 and the vertical distance AG represents that contribution to the velocity as a result of completion of the nuclear Mode 2. The total velocity represented by the vertical distance AD is the sum of vertical distance AB and AC. The point A corresponds approximately to a gross weight of approximately 1.5 million pounds, and the point D corresponds to a total velocity of approximately 32,000 feet per second which may be just sufficient, depending on drag and gravity losses, to achieve orbital flight. This point D is higher than point H which corresponds to operation in chemical Mode 1 without a subsequent nuclear Mode 2 (point G which is the abscissa of point H corresponds to zero contribution by the then absent nuclear Mode 2). Point H thus represents a possible marginal condition, but more favorable conditions result when propulsion is accomplished in two different modes as taught by this invention.

It will be seen that while point D represents an enhanced velocity, it is not the maximum velocity obtainable. The maximum velocity is represented by point M where the slope of curve FDMH is zero corresponding to the conditions expressed by equations (4) and (5) above. This point M corresponds to a velocity of approximately 33,500 feet per second and a gross weight of approximately 2.25 million pounds which in turn corresponds to a volume $V_1$ (the combined volume of hydrogen and oxygen used for completion of chemical Mode 1) of approximately 70,000 out of a total of 130,000 cubic feet. In this optimum condition represented by vertical line MNPR, the velocity derived by chemical Mode 1 is represented by the vertical distance RN and that derived by nuclear Mode 2 is represented by the vertical distance RP, the total velocity RM being equal to velocities RP + RN.

It is noted that the particular sequence in which the engines are operated is of importance since if the sequence of operations were reversed, i.e. the chemical engines of propulsion Mode 1 were operated after the nuclear engines of propulsion Mode 2, in such case the curve FDMN would no longer be concave downwardly but concave upwardly with velocity values therealong being less than the velocity represented by its highest point H. This is also discernable from equation (5) which indicated that for increased instead of decreased velocity, the operation of chemical Mode 1 should precede the operation of nuclear Mode 2.

It is noted further, as indicated previously, that the characteristic liner EBNH and GPCF are nonlinear, this being so since each is derived from the basic rocket equation which, as seen in equation (3) above, involves a logarithmic term $\log_e r$. Indeed, it is considered that if such lines were linear there would be no enhanced velocity represented, for example, by points D and M in FIG. 4, each of which represents a higher velocity than point H.

It is seen from the foregoing that the arrangements described maximize performance. The term performance has reference to increased velocity at a given payload or increased payload for the same velocity gain. Thus, the present invention results in comparable or greater performance at less gross weight than is the case when only Mode 1 propulsion is used. Also, another advantage of the invention is that comparable, or better performance is obtained with less volume requirements for a given performance level than is the case when only Mode 2 propulsion is used.

It will be appreciated that there may be some tapering or blending of propulsion modes in that, for example, instead of Mode 2 operation commencing after complete cessation of Mode 1 operation, Mode 2 operation may begin at a time somewhat prior to completion of Mode 1 operation. State in other words, the operation of Modes 1 and 2 may to some degree overlap in time.

Another advantageous criteria of the present invention is that in a chemical-nuclear application, the nuclear Mode 2 is operated after the chemical Mode 1, i.e. an appreciable distance from the earth's surface thereby avoiding or greatly minimizing those dangers which otherwise exist when nuclear reactions take place on or close to the earth's surface.

Figure 6:
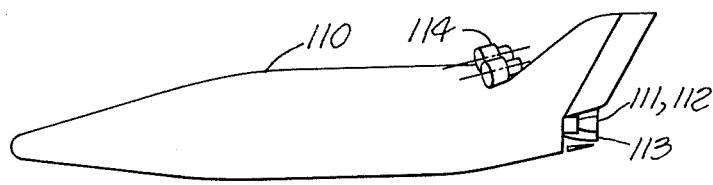
FIGS. 6–10 illustrate features of a modified system also embodying features of the present invention.
Figure 7:
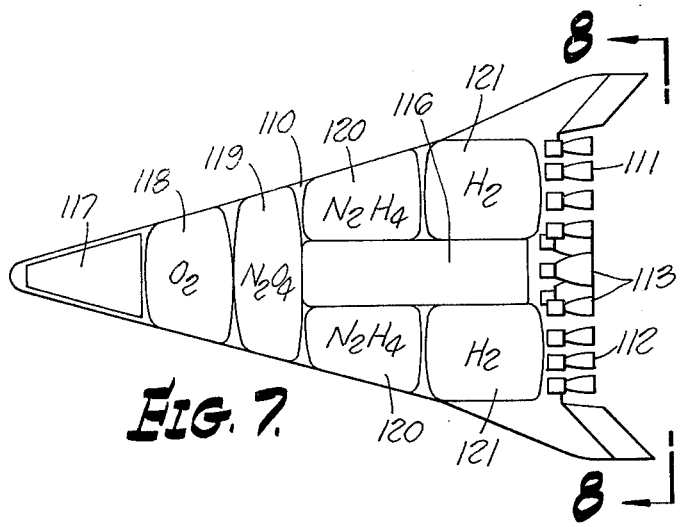
Figure 8:
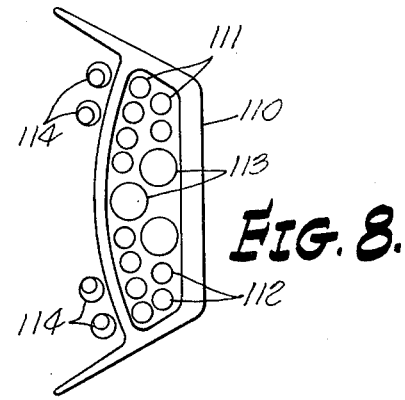

The aerospace vehicle 110 shown in FIGS. 6–8 is featured by two different forms of fuel consuming rocket engines; namely, two groups of six engines 111, 112 designed for the consumption of storable propellants, for example, nitrogen tetroxide and hydrazine, each engine capable of developing a thrust of say 400,000 pounds with a specific impulse, I, equal to about 280 seconds (at sea-level); and a centrally located group of three cryogenic engines 113 designed for the consumption of cryogenic propellants, for example, liquid oxygen and liquid hydrogen, each engine being capable of developing an individual thrust of 475,000 pounds, with specific impulse, $I_1$ equal to 465 seconds (in vacuum). In addition, an auxiliary group of four airbreathing engines 114 requiring a relatively small amount of hydrocarbon fuel (not shown) is utilized for airfield approach and landing after the orbital mission is completed.

As illustrated, these engines, 111, 112, 113 and 114 are located aft, the payload compartment 116 midship and the cabin for crew and controls 117 is in the forward nose portion. The remaining portion of the vehicle includes six fuel compartments; namely, a liquid oxygen compartment 118, a nitrogen tetroxide compartment 119, two hydrazine compartments 120, and two liquid hydrogen compartments 121. (The number of fuel compartments could be reduced if liquid oxygen were used as the oxidizer for both hydrazine and hydrogen, thus eliminating the need for a second oxidizer, nitrogen tetroxide in this case).

These engines incorporate as component parts thereof conventional valving means (not shown) controllable from the cabin 117 through which propellant from compartments 118, 119, 120, and 121 to such engines is supplied.

These engines in accordance with important features of the present invention are operated sequentially, i.e., after operation of the groups of engines 111, 112 during and after lift-off, the cryogenic engines 113 are operated. Thus, initially during operation of engines 111, 112 nitrogen tetroxide and hydrazine from compartments 119 and 120 is supplied; and during subsequent operation of engines 113, liquid oxygen and liquid hydrogen from compartments 118 and 121 is being supplied.

In accordance with one of the important features of the present invention, the volume and hence weight distribution alloted to each propellant compartment is optimized to achieve maximum gain in velocity of the vehicle which, as is described in more detail in connection with FIG. 9, amounts to a velocity greater than that achieved when the total available propellant compartment space, V, (FIG. 10) is used exclusively for storable type engines 111, 112 or exclusively for cryogenic type engines 113.

Figure 9:
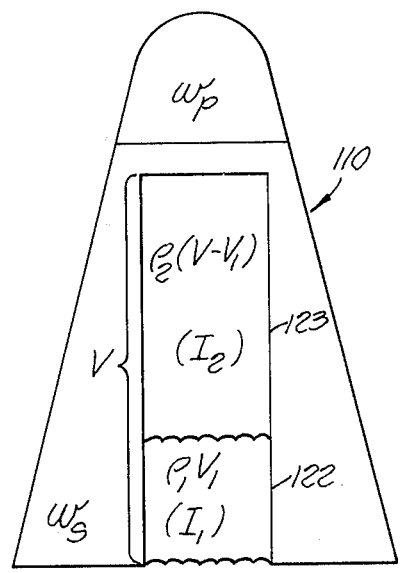

With reference to FIG. 9, the total volume available for propellant is designated as V, and the volume 122 used for the storable engines is designated as $V_1$, hence the volume 123 used for cryogenic engines is equal to the total volume V minus $V_1$ or $V-V_1$ as also designated in FIG. 9.

FIG. 9 is illustrative also of weight relations and includes the designations $W_i$ and $W_p$ and also $\rho_1$ and $\rho_2$ and $I_1$ and $I_2$ where:

$W_i$ is equal to weight of vehicle 10 less payload and less usable propellant.

$W_p$ is the payload weight.

$\rho_1$ is the bulk density of propellant in volume $V_1$ in this example, the average density of nitrogen tetroxide and hydrazine.

$\rho_2$ is the bulk density of propellant in volume $V-V_1$, in this example the average density of liquid oxygen and liquid hydrogen.

$I_1$ is the specific impulse of Mode 1 fuel, in this example the mixture of nitrogen tetroxide and hydrazine.

$I_2$ is the specific impulse of Mode 2 fuel, in this example oxygen and hydrogen.

The mass ratios $r_1$ and $r_2$ are as set forth in the following two equations:

$$r_1 = \frac{\rho_1 V_1 + \rho_2(V-V_1) + W_i + W_p}{\rho_2(V-V_1) + W_i + W_p} \quad (7)$$

$$r_2 = \frac{\rho_2(V-V_1) + W_i + W_p}{W_i + W_p} \quad (8)$$

It will be seen that the numerator in equation (7) is the initial weight of the vehicle completely loaded with propellant in volumes 122 and 123 and that the denominator is the weight of the vehicle after the propellant of the initial Mode 1 propulsion system has been used. Likewise the numerator in equation (8) is the same as the denominator of equation (7) and that the denominator of equation (8) represents the weight of the vehicle after all propellants in Volumes 122 and 123 has been used.

Applying the well-known rocket equation, the change in velocity $\Delta v$ which results from the sequential operation of the two propulsion modes, in this example the storable mode followed by the cryogenic mode, is set forth in equation (9) below:

$$\Delta v = g I_1 \log_e r_1 + g I_2 \log_e r_2 \quad 9$$

where $g$ represents the acceleration of gravity.

The values of $r_1$ and $r_2$ in equation (9) are as set forth in equations (7) and (8). Thus it will be appreciated that the gain in velocity $\Delta v$ may be represented in terms of volume $V_1$ as the independent variable, all other parameters being regarded as constant for a first approximation.

Principles of calculus are used to learn of conditions for optimum, i.e. maximum. For this purpose, the expression $\Delta v$ is differentiated with respect to volume $V_1$ and the resulting mathematical expression is set equal to zero as represented in equation (10).

$$\frac{d(\Delta v)}{dV_1} = 0 \quad (10)$$

When this is accomplished, it will be seen that a desired maximum value of $\Delta v$ occurs when $$V_1 = \frac{\rho_1 I_1}{\rho_2 I_1} - 1 \quad \frac{\rho_2 V + W_i + W_p}{\rho_1 - \rho_2} \quad (11)$$

Here again, as explained previously in connection with equation the density-impulse, $_1$ of the chemicals used in the first stage should exceed the density-impulse of the second stage and also the density of the fuel used in the first stage should exceed the density of the fuels used in the second stage.

Figure 10:
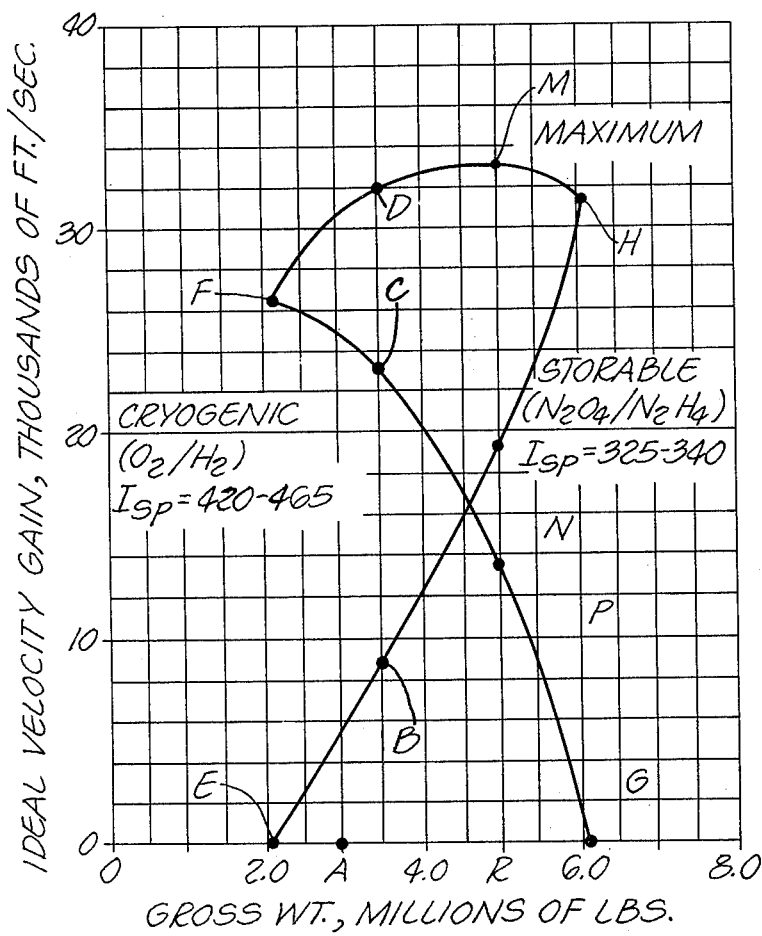

This novel teaching is incorporated in the present illustrated apparatus to achieve single stage flight from earth to near-orbit as represented also in FIG. 10 where the abscissas of the graphical representations are in terms of velocity gain $\rho v$, expressed in thousands of feet per second, and the ordinates are gross weight expressed in millions of pounds in accordance with the following mathematical expression which also appears in equation (7) above $$\text{Gross Weight} = \rho_1 V_1 + \rho_2 (V-V_1) + W_i + W_p \quad 12$$

The preformance curves in FIG. 10 refer to a vehicle having a given usable propellant volume V, as defined above in relation to FIG. 9 and in which the portion of volume V (i.e. volume $V_1$) allocated to Mode 1 is varied. This parameter $V_1$ varies from zero to maximum volume V, resulting in a corresponding variation in gross weight. In this respect, it is noted that the abscissa of points E and F corresponding to $V_1$ equal zero, and the abscissa of points G and H correspond to $V_1$ equal the maximum volume V. Further, it is noted that FIG. 10 represents the performance of various versions of a vehicle having a weight range extending from points E and F to approximately a weight range represented by the distance between points G and H.

In analyzing FIG. 10, it is noted that to achieve orbital flight, a $\Delta v$ of 26,000 feet per second in addition to those drag and gravity losses equivalent to perhaps about 6,000 feet per second is required. In other words, orbital flight is expected only when the ideal or calculated Δv appreciably exceeds 32,000 feet per second. This is achieved in accordance with features of the present invention using only a single stage vehicle.

In FIG. 10, the nonlinear line EBH represents the characteristic line of storable Mode 1 using nitrogen tetroxide and hydrazine as the propellant and the nonlinear line GCF represents the line of cryogenic Mode 2 using oxygen and hydrogen as the propellant. The total velocity change represented at, for example, the point D on that arcuate curve extending between points FDMH is the result of propulsion in Mode 1 followed by Mode 2. Thus, the vertical distance AB represents the velocity as a result of completion of storable Mode 1, and the vertical distance AC represents that contribution to the velocity as a result of completion of the cryogenic Mode 2. The total velocity represented by the vertical distance AD is the sum of vertical distance AB and AC. The point A corresponds approximately to a gross weight of approximately 3.5 million pounds, and the point D corresponds to a total velocity of approximately 32,000 feet per second which may be sufficient, depending on drag and gravity losses, to achieve orbital flight. This point D is higher than point H which corresponds to operation in storable Mode 1 without a subsequent cryogenic Mode 2 (point G which is the absicissa of point H corresponds to zero contribution by the then absent cryogenic Mode 2). Point H thus represents a possible marginal condition, but more favorable conditions result when propulsion is accomplished in two different modes as taught by this invention.

It will be seen that while point D represents an enhanced velocity, it is not the maximum velocity obtainable. The maximum velocity is represented by point M where the slope of curve FDMH is zero corresponding to the conditions expressed by equations (10) and (11) above. This point M corresponds to a velocity of approximately 5.0 million pounds which in turn corresponds to a volume $V_1$ (the combined volume of nitrogen tetroxide and hydrazine used for completion of chemical Mode 1) of approximately 55,000 out of a total of 75,000 cubic feet. In this optimum condition represented by vertical line MNPR, the velocity derived by storable Mode 1 is represented by the vertical distance RN and that derived by cryogenic Mode 2 is represented by the vertical distance RP, the total velocity RM being equal to velocities RP + RN.

It is noted that the particular sequence in which the engines are operated is of importance since if the sequence of operations were reversed, i.e. the storable engines of propulsion Mode 1 were operated after the cryogenic engines of propulsion Mode 2, in such case the curve FDMH would no longer be concave downwardly but concave upwardly with velocity values therealong being less than the velocity represented by its highest point H. This is also discernible from equation (11) which indicates that for increased instead of decreased velocity, the operation of storable Mode 1 should precede the operation of cryogenic Mode 2.

It is noted further, as indicated previously, that the characteristic lines EBNH and GPCF are nonlinear, this being so since each is derived from the basic rocket equation which, as seen in equation (9) above, involves a logarithmic term $\log_e r$. Indeed, it is considered that if such lines were linear, there would be no enhanced velocity represented, for example, by points D and M in FIG. 4, each of which represents a higher velocity then point H.

It is seen from the foregoing that the arrangements described maximize performance. The term performance has reference to increased velocity at a given payload or increased payload for the same velocity gain. Thus, the present invention results in comparable or greater performance at less gross weight than is the case when only Mode 1 propulsion is used. Also another advantage of the invention is that comparable or better performance is obtained with less volume requirements, and hence less manufactured hardware weight, for a given performance level than is the case when only Mode 2 propulsion is used.

It will be appreciated that there may be some tapering or blending of propulsion modes in that, for example, instead of Mode 2 operation commencing after complete cessation of Mode 1 operation, Mode 2 operation may begin at a time somewhat prior to completion of Mode 1 operation. State in other words, the operation of Modes 1 and 2 may to some degree overlap in time.

It will also be appreciated that other propellant combinations are possible than those used as an example in the above description. For example, when oxygen-hydrogen is used for Mode 2, then Mode 1 may consist of oxygen as the oxidizer, in combination with fuels such as hydrazine or some hydrocarbon (e.g.—RP-1, low grade kerosene or methane), or of hydrogen peroxide, nitric acid or some compounnd of fluorine as the oxidizer, in combination with the same or similar fuels. Also, when nuclear propulsion (using hydrogen) is used for Mode 2, then Mode 1 may consist, for example, of oxygen-hydrogen or any of the above propellant combinations as well as many others. Provided that the density impulse and density relations as expressed in equations (5) and (11) above have the relative values expressed therein which would not result in the velocity V being a negative quantity.

It will be appreciated further that, although mixed mode propulsion has been described here in terms of its application in a single-stage vehicle, the mixed mode approach may provide equally important performance improvements when incorporated in all or any of the stages of a multi-stage vehicle.

This can be illustrated analytically by modifying equations (6) and (11) to allow for jettisoning a weight $w_j$ (i.e.—tanks, engines, stages, etc.) before initiating Mode 2 operation. Thus:

$$V_1^*(w_j) = \frac{(\rho_2 V + w_t + w_j + w_p)}{2 \rho_2 I_2 (\rho_2 - \rho_1)} [(\rho_2 I_2 - \rho_1 I_1) + I_2 (\rho_2 - \rho_1)] \quad (13)$$
$$+ [(\rho_2 I_2 - \rho_1 I_1) - I_2 (\rho_2 - \rho_1)]^2 - \frac{4 I_1 I_2 \rho_1 (\rho_2 - \rho_1) w_j}{(\rho_2 V + w_t + w_j + w_p)}$$

Equation (13) states in effect that the mixed mode, optimization exists in principle for a multi-stage as well as a one-stage vehicle, and that the optimum volume split tends to favor lower density-impulse propellants for upper stages.

Other arrangements suggest themselves in the light of the above. In some specific instances, the second mode may involve very energetic propellants such as fluorine-hydrogen which may be characterized as a partially storable or partially cryogenic propellant. In such case the first mode may consist of a propellant such as oxygen-hydrogen, both the density-impulse and density of which would then be less then, instead of greater than, the density-impulse and density of mode two. Of course, the oxygen-hydrogen propellant in that case is characterized as acryogenic propellant. While in accordance with equation (11) above such a combination would not maximize performance, the high energy of Mode 2 may be sufficient to establish single stage to orbit nevertheless. An overriding reason for this combination of propellants and their sequence of operation involves considerations as to the toxicity of exhaust products of many high energy propellants such as fluorine-hydrogen, which should be used only beyond the atmosphere.

The generalized form of space vehicle 210 shown in FIGS. 11–14 is featured by three different forms of fuel consuming engines; namely, a centrally located group of two engines, 211, each of which may, for example, be standard space shuttle oxygen and hydrogen engines capable of developing an individual vacuum thrust of 632,000 pounds with a specific impulse of 465 seconds; two groups of, for example, oxygen-hydrocarbon (e.g. RP-1), engines 212, 213 with each group consisting of six engines each, as illustrated, and being capable of a sea level thrust of 550,00 lb., with vacuum specific impulse equal to 350 seconds; and also, optionally, as shown, a forward group of four airbreathing engines 214, burning RPI, and each being capable of providing 35,000 lb., thrust at sea level.

As illustrated, the rocket engines 211, and 212, and 213 are located aft, the airbreathing engines 214 are located forward, the payload bay 215 and cabin 216 are located midship, and the on-orbit propellant tanks 217 are located fore of and beneath the cabin 216. The remaining portion of the vehicle includes two main tanks 218, containing liquid oxygen and liquid hydrogen as shown, and integral wing/carry-through tanks 219, containing RP-1 or some other appropriate hydrocarbon and landing gear wells.

It is noted that tank 218 incorporates a common bulkhead 221 which separates tank 218 into two parts, one part containing oxygen, and the other part containing hydrogen. The tank 219 occupies the major part of the volume of the wings and the interconnecting centrally located carrythrough structure as illustrated in FIG. 14.

These engines incorporate as component parts thereof, conventional valving means (not shown) controllable from the cabin 216 through which propellant from tanks 218 and 219 to such engines is supplied.

The rocket engines 211, 212, and 213 in accordance with important features of the present invention are operated sequentially, i.e. after operation of the groups of engines 212, 213 during and after liftoff, the engines 211 are operated. Thus, initially during operation of engines 212, 213, liquid oxygen and RP-1 from tanks 218 and 219 is supplied; and during subsequent operations of engines 211, liquid oxygen and liquid hydrogen from tank 218 is supplied. After return from orbit and during approach and landing, the air-breathing engines 214, when present, are operated, utilizing RP-1 supplied from tank 219. For on-orbit maneuvers, liquid oxygen and liquid hydrogen from tanks 217 may be supplied to numerous small rocket engines (not shown) to accomplish maneuvers and attitude control.

In accordance with one of the important features of the present invention, the volume and hence weight distribution alloted to each propellant tank is optimized to achieve maximum gain in velocity and reduced size of the vehicle, as described above so as to achieve a velocity greater than that achieved when the total available propellant tank volume is used exclusively for oxygen-RP type engines 212, 213 or exclusively for oxygen-hydrogen type engines 211.

It will be appreciated that there may be some tapering and blending or propulsion modes in that, for example, instead of Mode 2 operation commencing after complete cessation of Mode 1 operation, Mode 2 operation may begin at a time somewhat prior to completion of Mode 1 operation. Stated in other words, the operation of Modes 1 and 2 may to some degree overlap in time.

It will be appreciated that other propellant combinations are possible than those used as an example in the above description. For example, some other hydrocarbon (e.g.—RJ-5, methane, etc.), or hydrazine might be used in place of RP-1 for Mode 1 fuel; fluorine or one of its compounds might be used in place of oxygen as the common oxidizer. Many other cmbinations are possible, including the possibility of two oxidizers and a common fuel.

It will be further appreciated that, although the three propellant mixed-mode vehicle has been described in connection with FIGS. 11–14 in terms of its application in a single-stage vehicle, this approach may provide equally important performance flexibility and size improvements when incorporated in all or any of the stages of a stage-and-a-half or multi-stage vehicle.

The mixed-mode rocket engines described in connection with FIGS. 15 and 16 use two or more propellants (in the case of the nuclear rocket engine in FIG. 15) or propellant combinations (in the case of a chemical rocket engine in FIG. 16).

FIG. 15 illustrates a typical mixed-mode nuclear rocket engine incorporating features of this invention. It involves the use of an engine such as, for example, the engine identified by the designation NERVA (Nuclear Engine for Rocket Vehicle Application), consisting of a graphite core reactor 301 surrounded by moderators 302 to control the escape or reflection of fission particles and thus control the reaction rate and reactor temperature. These components are in turn surrounded by a radiation shield 303 to reduce radiation levels outside the engine, the whole being encased in a structural shell and rocket nozzle 304. In the exemplified NERVA, liquid hydrogen ($H_2$) from a hydrogen tank 306 is pumped into the spaces 307 in and about the reactor as indicated by arrows 308, 309, 310, and 311 where it is gasified to high temeratures and then expands at high exhaust velocity through the nozzle 304 to provide forward thrust. Some of the liquid hydrogen is bled off via line 312 and fed into the conventional hollow-walled nozzle 304 to provide cooling, after which it is dumped into the reactor chamber via lines (not shown) in the form of internal passages within the wall of the nozzle as in conventional, regenerative rocket nozzle construction to be further heated and become part of the exhaust. In accordance with other features of the present invention, a second, denser propellant supplied from tank 315 in this case methane, $CH_4$, (although ammonia, $NH_3$, is another possible example), is used in the system, and it is used analogously to the hydrogen, but is exhausted before hydrogen flow starts, to achieve the overall performance gains in accordance with the basic mixed-mode principle as expressed in the above equations.

In operation of the mixed-mode nuclear engine in FIG. 15, the methane is first used being pumped by turbopump 320, driven by gas generator 321, the methane flowing through valve 322 in line 323 and enters the reactor as indicated by arrows 308 and 309. Some methane enters the nozzle via valve 328 in line 327. This use of methane constitutes the first mode operation followed by the second mode operation wherein the flow of methane is now interrupted and hydrogen is supplied from tank 306 via turbopump 324 and valve 325 with also some hydrogen being fed to the nozzle 304 as described previously via valve 330 in line 331.

FIG. 16 illustrates a typical mixed-mode chemical rocket engine incorporating other features of this invention. It uses an engine exemplified by the designation SSME (Space Shuttle Main Engine). In the SSME, hydrogen ($H_2$) and oxygen ($O_2$) are both fed into preburners 405 and 406 where they are combusted fuel-rich to produce relatively low temperature exhaust gasses which drive the hydrogen and oxygen turbopumps 407 and 408. These turbopumps 407 and 408 in turn pump the main flow of propellants into the thrust chamber 410 where they are combusted to produce high temperature gasses at high pressure of approximately 3,000 psi. The flow of hydrogen from tank 419 to preburners 405 and 406 is respectively through valves 420 and 421 in lines 422 and 423 respectively. Likewise, the flow of oxygen from tank 430 to preburners 405 and 406 is via valves 432 and 433 in lines 434 and 435 respectively. Such gases expand out through a nozzle 412 to provide forward thrust. Some of the liquid hydrogen from tank 419 is bled off upstream of the preburner via valve 440 in line 441 and fed into the hollow walls of the nozzle and thrust chamber 412 to provide cooling, after which it is dumped into the thrust chamber portion 410 to be further heated by participation in the combustion process. In the SSME, all of the hydrogen (except that used for cooling) reaches the thrust chamber in gaseous form, while most of the oxygen reaches the thrust chamber as a liquid via valve 444 in line 445 where it is sprayed into the champer 410 through an injector 446. This is called a "staged combustion" cycle, as combustion occurs in two steps. In accordance with other features of the present invention, a second, denser fuel supplied from tank 450 (in this case kerosene or other hydrocarbon) is incorporated in the system, which is fed and burned with the oxygen in the same way as is the hydrogen, but the kerosene is used up before hydrogen flow starts, to achieve the overall performance gains in accordance with the mixed-mode principle as expressed in the above equations.

During Mode 1 operation, oxygen and kerosene are used with the kerosene being supplied to the preburner 460 via valve 461 in line 462 and the oxygen being supplied to the same preburner 460 via valve 463 in line 464. The main flow of kerosene is pumped by turbopump 465 via valve 466 in line 467 to the injector 446. Also some kerosene is supplied via valve 470 in line 471 to the hollow walls of the nozzle and thrust chamber 412 for purposes previously described in connection with operation of the conventional SSME. In addition, provision may be included to cool the nozzle throat with hydrogen during the oxygen-kerosene Mode 1 burn when the kerosene proves marginal or inadequate as a coolant, the hydrogen being supplied via valve 472 in line 473.

During subsequent Mode 2 operation, the flow of kerosene no longer occurs, and there is a LOX-hydrogen burn as described above in connection with conventional operation of the SSME.

It will be appreciated that in both the nuclear and chemical cases exemplified in FIGS. 15 and 16 respectively, some mode overlap may be desirable for overall performance reasons. That is, between pure Mode 1 and pure Mode 2, there may be a transition phase in which both methane and hydrogen flow simultaneously (nuclear case), and both kerosene and hydrogen simultaneously (chemical case). It will be appreciated that where smaller flows are required, such as for cooling, several engines may be fed from a single pump.

It will be seen that in the arrangement shown in FIGS. 1-5 and also in FIGS. 6-10 and also in FIGS. 11-14 and also in FIG. 15 and also in FIG. 16 that the density-impulse and also the density of the propellant combination in the first propulsion mode is greater than the corresponding density-impulse and density of the propellant combination in the second propulsion mode. It's noted that in particular in FIGS. 11-14 the propellant combination in the first mode is liquid oxygen and RP-1 and this combination has a greater density-impulse and density than the propellant combination, liquid oxygen and liquid hydrogen used in the second propulsion mode. The airbreathing engines described in connection with FIGS. 11-14 are optional and are not considered part of the mixed mode operation. The airbreathing engines are not part of the main propulsion means necessary for ascent from earth to orbit.

Further, it is noted that in FIGS. 1-5 there is a single mode nuclear rocket engine operating on hydrogen only in the second propulsion mode, the first propulsion mode using liquid chemical rocket engines burning liquid hydrogen and liquid oxygen. FIG. 15 is a nuclear engine using methane as the operating fluid for the first propulsion mode and hydrogen as the operating fluid for the second propulsion mode.

In the arrangement shown in FIGS. 6-10 and also in FIGS. 11-14, both are characterized as all chemical liquid rocket vehicles in that the propellant combination in the first mode in FIGS. 6-10 is nitrogen tetroxide and hydrazine and in the second propulsion mode, — liquid oxygen and liquid hydrogen; and in FIGS. 11-14 the propellant combination in the first propulsion mode is liquid oxygen and RP-1 and in the second propulsion mode liquid oxygen and liquid hydrogen. The arrangement in FIGS. 11-14 is preferred because it is an all chemical rocket vehicle and involves only three propellants (the arrangement in FIGS. 6-10 involves four different propellants). It is noted that the arrangement in FIG. 16 involves also the use of only three propellants as in FIGS. 11-14 but in FIGS. 11-14 the two propellant combinations (oxygen, RP-1 and oxygen and hydrogen) are burned in two different types of engines, each type being specifically designed to handle only one propellant combination. In contrast, is FIG. 16 which involves the use of a single new type of engine capable of burning two different propellant combinations, namely first oxygen and RP-1 (kerosene) and subsequently oxygen and hydrogen.

While the particular embodiments of the present invention have been shown and described, it will be obvious to those skilled in the art that changes and modifications may be made without departing from the invention in its broader aspects, and therefore, the aim in the appended claims is to cover all such changes and modifications as fall within the true spirit and scope of this invention.

I claim:

1. In a vehicle system in which it is desired to propel a vehicle stage along a trajectory through space using chemical engine means exlusively with said chemical engine means obtaining energy for main propulsion of said vehicle stage from a chemical reaction of propellants in said chemical engine means, wherein the improvement comprises, the steps of using said chemical engine means exclusively to provide two modes of main propulsion of said vehicle stage with each of said modes using different liquid chemical propellant combinations each capable of translating the vehicle stage center of gravity along a trajectory through space for a sustained long time duration to effect said main propulsion of said vehicle stage for a substantially long distance; operating said chemical engine means in a first one of said modes of main propulsion in said vehicle stage to propel the vehicle stage by a first liquid chemical propellant combination; discontinuing operation of said one mode of main propulsion; then operating the other mode of main propulsion in said vehicle stage to propel the same by a second liquid chemical propellant combination, said first mode of main propulsion further including the step of using a first liquid chemical propellant combination in said engine means having a higher density and density-impulse, and a lower specific impulse, than the liquid chemical propellant combination being used in said engine means in said other mode of propulsion.

2. In a propulsion system as set forth in claim 1 including the step of operating both of said two modes contemporaneously and then discontinuing operation of said one mode but continuing operation of said other mode.

3. In a propulsion system as set forth in claim 2 including the step of operating said other mode during substantially the entire time during which said one mode is operating.

4. A system as set forth in claim 1, the steps including providing said vehicle stage with three different rocket propellants, which comprises a common oxidizer and two different fuels and using the oxidizer and fuels to provide the main propulsion.

5. A system as set forth in claim 1, the steps including providing said vehicle stage with three different rocket propellants, which comprise a common fuel and two oxidizers used to provide the main propulsion.

6. A system as set forth in claim 1 including the steps of operating said one mode of main propulsion and said other mode of main propulsion such that the velocity of said vehicle is increased sufficiently as a result of operation in said one and other modes to enable it to transport itself from the earth to earth orbit.

7. In a vehicle system in which it is desired to propel a vehicle stage along a trajectory through space using chemical engine means exclusively with said chemical engine means obtaining all of the energy for main propulsion of said vehicle stage from a chemical reaction of propellants in said chemical engine means, wherein the improvement comprises, means including said chemical engine means in said vehicle for producing two different modes of propulsion with each of said modes using different liquid chemical propellant combinations capable of translating the vehicle stage center of gravity along a trajectory through space for a sustained time duration to effect propulsion of said vehicle stage for a substantially long distance; means for operating said chemical engine means in one of said modes of main propulsion by a first liquid chemical propellant combination; means for discontinuing operation of said one mode of main propulsion; said chemical engine means including means for operating in the other mode of main propulsion by a second liquid chemical propellant combination after discontinuance of operation of said one mode of main propulsion, the liquid chemical propellant combination used in said one mode of main propulsion having a higher density and density-impulse, and a lower specific impulse, than the second propellant combination.

8. In a propulsion system as set forth in claim 7, means for operating both of said two modes contemporaneously and then discontinuing operation of said one mode but continuing operation of said other mode.

9. In a propulsion system as set forth in claim 8 including means for operating said other mode during substantially the entire time during which said one mode is operating.

10. A system as set forth in claim 7, three different rocket propellants, which comprise a common oxidizer, and two different fuels, and means using the oxidizer and fuels to provide main propulsion of said vehicle stage.

11. A system as set forth in claim 7, means providing said vehicle stage with three different rocket propellants, which comprise a common fuel, and two oxidizers used to provide the main propulsion.

12. A system as set forth in claim 7 including means operating said one mode of main propulsion and said other mode of main propulsion such that the velocity of said vehicle stage is increased sufficiently as a result of operation in said one and said other modes to enable it to transport itself and its payload from the earth to earth orbit.

* * * * *